US007036360B1

(12) United States Patent
Gushman et al.

(10) Patent No.: US 7,036,360 B1
(45) Date of Patent: May 2, 2006

(54) POWERTRAIN DYNAMIC TILT TEST RIG

(75) Inventors: Richard W. Gushman, Rochester Hills, MI (US); John Swiecilo, Warren, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/007,335

(22) Filed: Dec. 8, 2004

(51) Int. Cl.
*G01M 19/00* (2006.01)

(52) U.S. Cl. .................. 73/118.1; 73/116; 73/117.2; 73/117.3

(58) Field of Classification Search ............... 73/118.1, 73/116, 117.2, 117.3
See application file for complete search history.

(56) References Cited

U.S. PATENT DOCUMENTS

| 2,333,450 | A | * | 11/1943 | Staley ................... 248/188.1 |
| 3,087,631 | A | * | 4/1963 | Kocher ................... 414/678 |
| 3,538,759 | A | * | 11/1970 | Schrom ................... 73/116 |
| 4,599,034 | A | * | 7/1986 | Kennedy et al. ............ 414/678 |
| 5,051,056 | A | * | 9/1991 | Gibbons et al. ............ 414/678 |
| 6,619,466 | B1 | * | 9/2003 | Jack et al. .................. 198/373 |

* cited by examiner

*Primary Examiner*—Edward Lefkowitz
*Assistant Examiner*—Freddie Kirkland, III
(74) *Attorney, Agent, or Firm*—Christopher DeVries

(57) ABSTRACT

A test rig is provided for dynamic or static testing of a vehicle powertrain apparatus during operation in varying attitudes. A specific embodiment includes inner and outer frames carried one inside the other on gimbal bearings and pivotable on longitudinal and transverse axes. The inner frame carries a cradle for mounting a dynometer connected to an engine, transmission or other apparatus to be tested by tilting the apparatus to simulate the effects of vehicle acceleration in various directions. The rig may be supported on individual stanchions mounted to a test bed floor plate in an engine test cell and supporting the bearings for the outer frame. The pivotable frames are powered by electric motors through reduction gear boxes sized and mounted to minimize mass and inertia of the rig and allow mounting in an engine test cell. Programmable controls permit dynamic rocking of an engine operating under power.

15 Claims, 3 Drawing Sheets

POWERTRAIN DYNAMIC TILT TEST RIG

TECHNICAL FIELD

This invention relates to test fixtures and, more particularly, to a dynamic tilt test rig adapted particularly for testing of vehicle powertrain components such as engines and transmissions during operation of the components in varying attitudes.

BACKGROUND OF THE INVENTION

It is known in the art to provide tilt rigs which have the capability of being used to simulate the effects of acceleration on fluids in powertrain components such as engines and transmissions, as well as other components. Simplified test rigs have commonly been used in engine test cells to simulate constant acceleration effects on engine oil in an operating engine.

Dynamic rigs capable of varying the attitude of an engine or transmission during testing to simulate dynamic acceleration inputs have been developed but are of very large physical size and not readily adaptable for use in the confines of conventional engine test cells. Most such tilt rigs utilize hydraulic power, which is not well adapted to an engine test cell environment because of the lack of centralized hydraulic power in these cells and potential problems with the use of high pressure hydraulics in a high temperature environment where mechanical damage to hydraulic lines is possible.

Development of a more practical dynamic tilt test rig for powertrain apparatus was desired.

SUMMARY OF THE INVENTION

The present invention provides a powertrain dynamic tilt test rig for use in testing powertrain apparatus, such as engines, transmissions, gearboxes and the like, which can be made in a size to accommodate the dynamic or static testing of vehicle powertrain components and can fit within a conventional engine test cell. The device includes inner and outer frames that are rotated independently by gear reduced electric motors. The outer frame is supported by two support stands which are secured to a base or a test cell bed plate. A test engine and water brake dynamonitor are mounted to the inner frame.

The outer frame pivots around a rotational pivot axis to simulate fore and aft acceleration forces (g-loads) while the inner frame rotates to simulate lateral acceleration forces (g-loads). An electrical motor and a reduction gear box is mounted to one of the support stands and pivots or rotates the outer frame. Another electric motor and reduction gear box is mounted to the outer frame and rotates the inner frame on a pivot axis at right angles to the pivot axis of the outer frame. Position feedback is provided to a control system by angle indicating devices on the pivot axes.

The use of electric drive motors and the gimballed frame layout enables the size of the test rig to be minimized to make it possible for its use in conventional engine test cells. Additionally, the use of electric power avoids the problems of possible hydraulic leaks during engine operation. The test rig may be controlled by a test cell computer which can be programmed to simulate a series of dynamic acceleration inputs, such as would be encountered during on road or race track vehicle maneuvers.

These and other features and advantages of the invention will be more fully understood from the following description of certain specific embodiments of the invention taken together with the accompanying drawings.

DESCRIPTION OF THE PREFERRED EMBODIMENT

Figure 1:
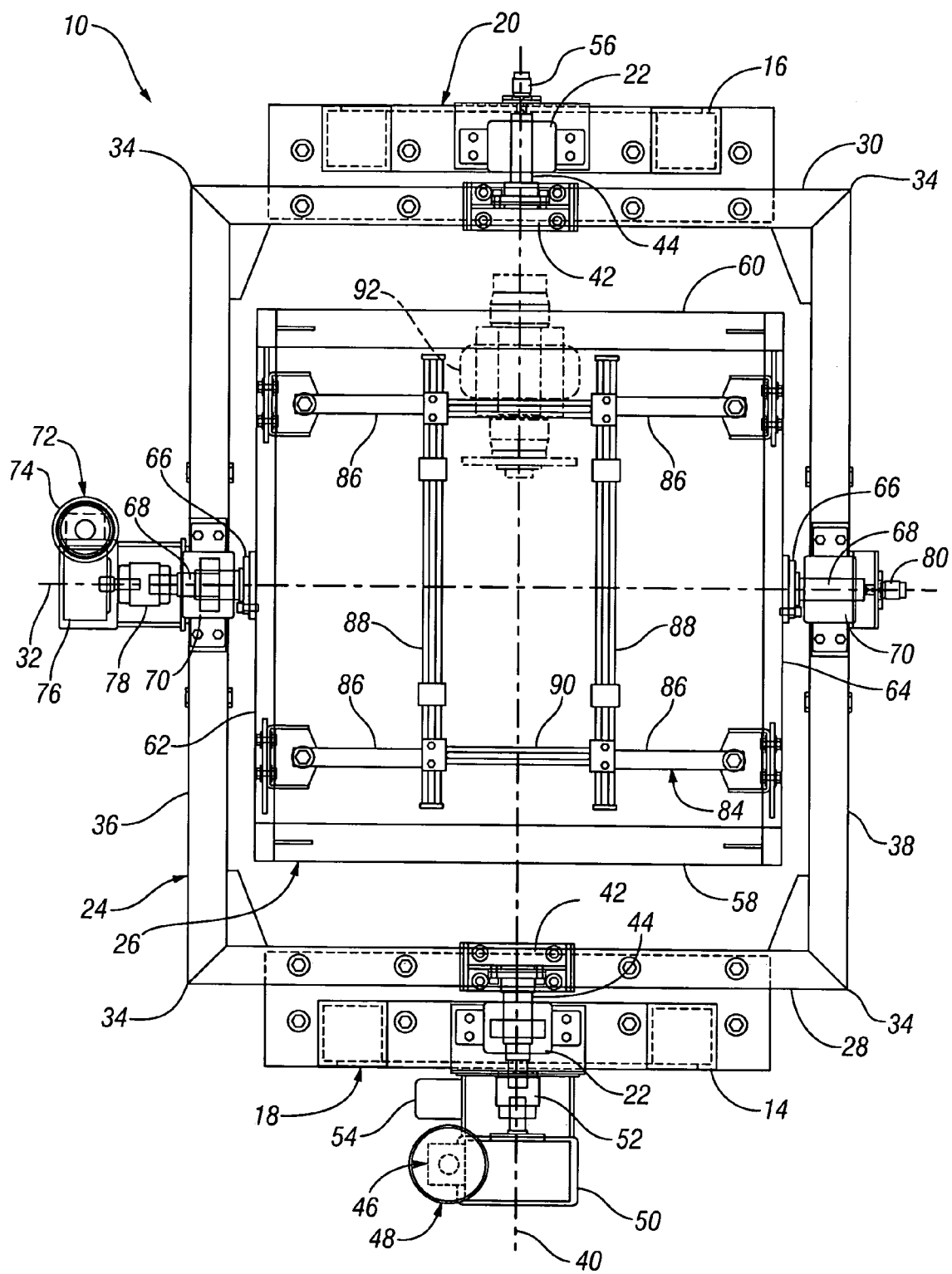
FIG. 1 is a top view of an exemplary embodiment of dynamic tilt test rig according to the invention.
Figure 2:
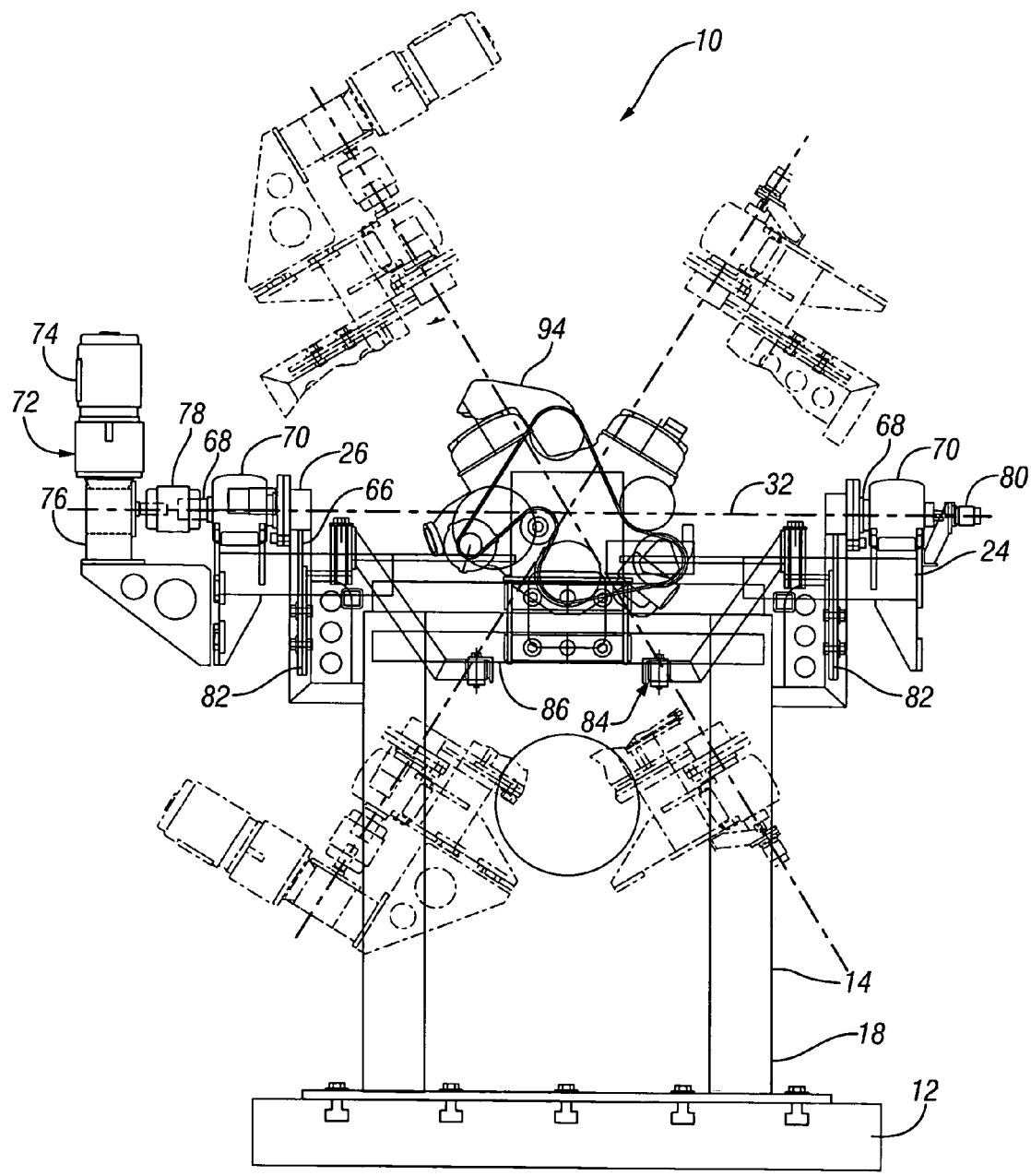
FIG. 2 is a front end view of the test rig of FIG. 1 showing a vehicle engine mounted in the rig and indicating the range of angular pivot motion of the outer frame.
Figure 3:
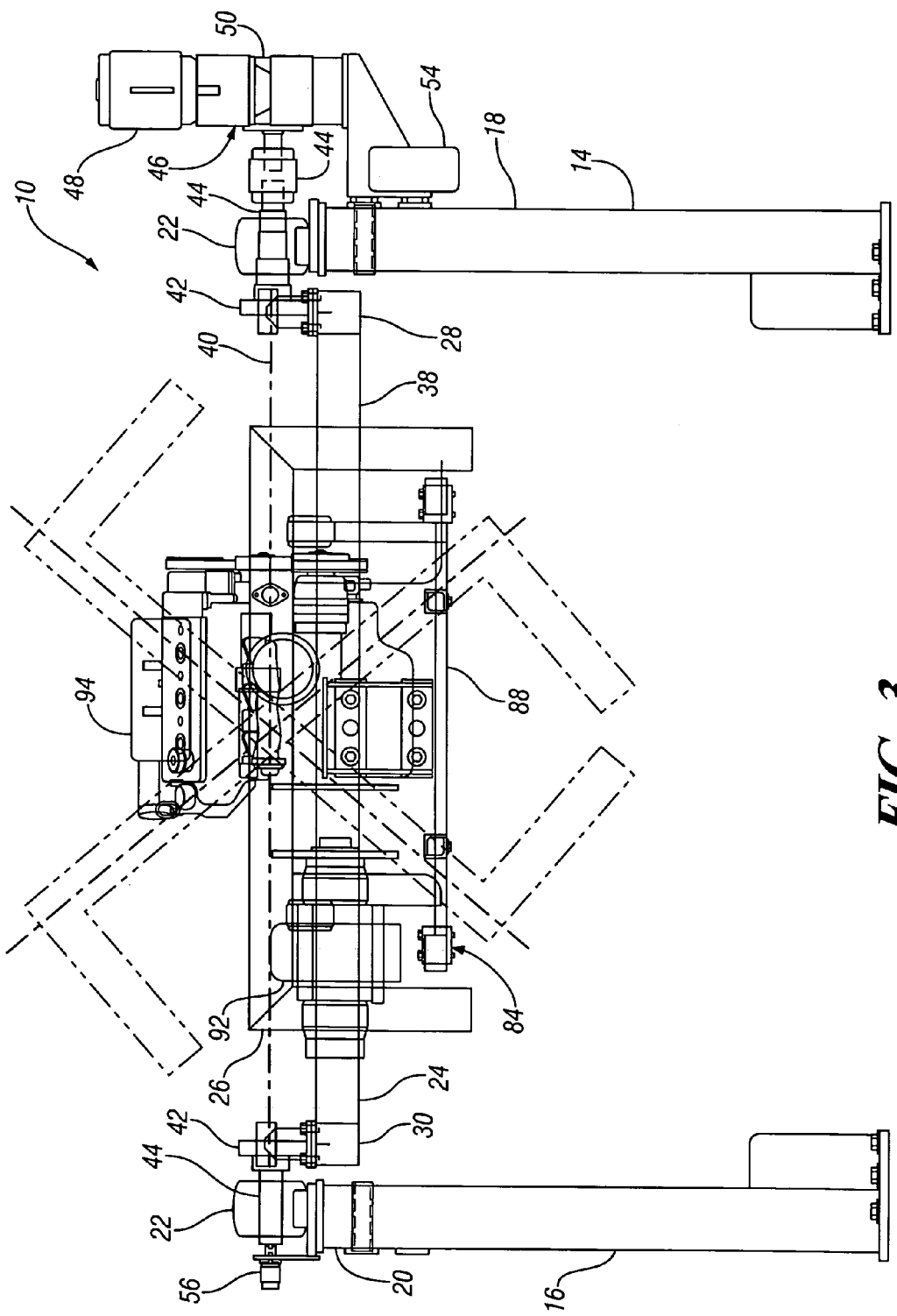
FIG. 3 is a left side view of the rig of FIG. 1 showing the engine and dynamometer relationships and indicating the range of angular pivot motion of the inner frame.

Referring now to the drawings in detail, numeral 10 generally indicates an exemplary embodiment of dynamic tilt test rig according to the invention. Test rig 10 is sized to fit within an engine test cell and is adapted for use in testing powertrain components, such as engines, transmissions, gear boxes and the like as well as for other possible uses.

Rig 10 may include a base but, in the disclosed embodiment, utilizes a separate base formed by a bed plate 12 mounted to the floor of an engine test cell. The rig 10 is supported by front and rear stanchions or stands 14, 16, respectively, which are independently secured to the bed plate 12. They extend laterally across front and rear ends 18, 20 of the test rig and respectively support gimbal bearings, one each on the front and rear stanchions 14, 16.

The test rig further includes an outer frame 24 and an inner frame 26. The outer frame includes front and rear end members 28, 30 spaced longitudinally from a transverse axis 32 and connected at outer ends 34 with left and right side members 36, 38 spaced transversely from a longitudinal axis 40. The end members may extend parallel with and be equally spaced from the transverse axis 32 and the side members 36, 38 may extend parallel with and be equally spaced from the longitudinal axis 40 to provide a generally rectangular configuration of the frame, which is centered on the axes.

The outer frame 24 is supported below the longitudinal axis 32 by hangers 42 mounted to the centers of the end members 28, 30 and connected with pivot shafts 44 that extend longitudinally on the axis 32 and are pivotally supported in the gimbal bearings 22. A pivot drive 46 including an electric drive motor 48 connected with an offset reduction gear box 50 is mounted to the front stanchion 14 and is connected by a coupling 52 with the pivot shaft 44 of the front end member 28. The motor is connected with a control panel 54 which may in turn be actuated by connection with a computer, located in an associated test cell not shown. The pivot shaft 44, connected with the rear end member 30, is attached to a rotational position encoder 56 supported from the rear stanchion 16.

The inner frame 26 also includes longitudinally spaced front and rear end members 58, 60, respectively, connected at their ends with right and left side members 62, 64, respectively, to form a generally rectangular frame disposed within the outer frame 24. The inner frame is pivotally supported by side hangers 66 connected with pivot shafts 68, which are in turn pivotally supported, in gimbal bearings 70 aligned on the transverse axis 40 and mounted on the right and left side members 36, 38 of the outer frame 24.

A pivot drive 72 including an electric drive motor 74 and an offset reduction gear box 76 is mounted to the right side member of the outer frame and includes an output shaft connected by a coupling 78 with the pivot shaft 68 extending from the right side member 62 of the inner frame 26. The pivot shaft 68, extending from the left side member 64, also connects with a rotational position encoder 80 carried on the outer frame 24.

The side hangers 66 also carry height adjustable supports 82, that in turn support a cradle assembly 84, which includes downwardly and inwardly angled transverse members 86 connecting inward with longitudinal and transverse mounting slides 88, 90 to which a water brake dynamometer 92 may be mounted and on which a vehicle engine 94, or a transmission or other rotary component, may be mounted for connection with the dynamometer.

In use, the dynamometer 92 may be permanently or temporarily mounted at one end of the cradle assembly 84 and an engine 94, for example, may be mounted in the cradle and connected to the dynamometer. The engine may then be started and operated in the tilt test rig 10 at any desired output power. The engine may then be tilted for and aft or side to side, or in any desired combination of these directions, in order to simulate lateral or longitudinal accelerations that may occur during operation of the engine in a vehicle. The effects on fluids stored or flowing in the engine may thus be determined.

In addition to constant acceleration conditions occurring in any lateral, longitudinal or combination direction, the test rig control, or associated computer, may be programmed to simulate directionally rotating or changing accelerations that may occur in an engine in a moving vehicle under conditions such as accelerating, turning, hill climbing, braking and combinations thereof. To provide a breadth of test positions desired, the illustrated embodiment of test rig 10 is capable of tilting the engine 94 up to 50 degrees fore and aft and up to 58 degrees from side to side or any combination of these positions. These capabilities are obtained in a rig sized to fit in an conventional engine test cell where the engine can be operated under controlled conditions and observed from a control room separated from the operating machinery.

To minimize the size and weight of the motors required for operating the rig 10, the electric motors are connected to the pivot shafts of their respective tilt frames by reduction gearing with a 200/1 ratio. The engine and dynamometer are positioned in the cradle so that the center of gravity (CG) of the combination is close to the intersection of the transverse and longitudinal pivot axes 32, 40. Also, the masses of the motors and gear boxes are positioned as close as possible to the CG so that the power requirements for dynamic motion testing of simulated engine accelerations are kept as low as possible.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A test rig for dynamic or static testing of a vehicle powertrain apparatus during operation in varying attitudes, said rig comprising:
    a pair of longitudinally spaced bearing supports adapted to be mounted in fixed relation to a base;
    an outer frame having spaced longitudinal ends connected by spaced transverse sides, the ends being carried by bearings fixed to said supports and aligned for pivoting motion of the outer frame about a longitudinal axis;
    an inner frame having spaced longitudinal ends connected by spaced transverse sides, the sides being carried by bearings fixed to the sides of the outer frame and aligned for pivoting motion of the inner frame within the outer frame about a transverse axis;
    a mounting cradle carried by the inner frame and adapted for mounting a powertrain apparatus for operation in the frame;
    a first rotatable drive operable to pivot the outer frame about the longitudinal axis relative to the bearing supports; and
    a second rotatable drive operable to pivot the inner frame about the transverse axis relative to the outer frame;
    whereby controlled operation of the drives allows tilting of the cradle in any direction relative to a vertical axis for testing the effects of static or dynamic tilting of the powertrain apparatus during operation of the apparatus while mounted in the cradle.

2. A test rig as in claim 1 wherein the rotatable drives include drive motors.

3. A test rig as in claim 2 wherein the drive motors are electric motors.

4. A test rig as in claim 3 wherein the rotatable drives include reduction gear boxes connected between the electric motors and their respective frames.

5. A test rig as in claim 4 wherein the drive motors are rated at not more than 2 HP and the gear boxes have a reduction ratio of at least 100 to 1.

6. A test rig as in claim 1 wherein the inner frame is adapted to carry a dynomometer.

7. A test rig as in claim 6 wherein the inner frame is adapted to carry a test engine connected to the dynamometer.

8. A test rig as in claim 1 wherein the bearing supports are carried by stanchions at front and rear ends of the test rig.

9. A test rig as in claim 8 wherein the stanchions are supported by a base.

10. A test rig as in claim 9 wherein the base is a bed plate of a test facility.

11. A test rig as in claim 1 wherein at least one of the outer and inner frames is rectangular.

12. A test rig as in claim 11 wherein both frames are rectangular.

13. A test rig as in claim 1 wherein the outer frame is offset below its rotational axis to partially lower the center of gravity of the frames.

14. A test rig as in claim 1 wherein the mounting cradle extends below the level of the inner frame to aid in positioning the center of gravity of a tested powertrain apparatus at a point near both of the pivot axes.

15. A test rig as in claim 14 wherein the cradle is supported on vertical adjusters to permit adjustment of the center of gravity of a tested apparatus.

* * * * *